United States Patent [19]
Anderson

[11] Patent Number: 4,595,064
[45] Date of Patent: Jun. 17, 1986

[54] DRAG ATTACHMENT FOR A DISK

[76] Inventor: Ronald D. Anderson, Rte. 1, Box 37A, Homer, La. 71040

[21] Appl. No.: 635,448

[22] Filed: Jul. 30, 1984

[51] Int. Cl.[4] .................. A01B 35/18; A01B 49/02
[52] U.S. Cl. ................... 172/178; 172/200; 172/673; 172/502; 172/398
[58] Field of Search .............. 172/178, 199, 200, 179, 172/180, 684.5, 673, 476, 502, 456, 413, 501, 398, 397

[56] References Cited

U.S. PATENT DOCUMENTS

| | | | |
|---|---|---|---|
| 1,153,916 | 9/1915 | Heggland | 172/476 X |
| 2,871,959 | 2/1959 | Koskenmaki | 172/200 X |
| 2,994,388 | 8/1961 | Ryan | 172/180 |
| 3,019,747 | 2/1962 | Strahan | 172/413 X |
| 3,090,447 | 5/1963 | Hotchkiss | 172/180 X |
| 3,090,448 | 5/1963 | Hotchkiss | 172/180 |
| 3,091,476 | 5/1963 | Blake | 172/413 |
| 3,490,542 | 1/1970 | Eiten | 172/470 |
| 4,113,028 | 9/1978 | Glueck | 172/178 |
| 4,250,970 | 2/1981 | Pfenninger | 172/398 |

FOREIGN PATENT DOCUMENTS 607691  11/1960  Canada ........................ 172/200

*Primary Examiner*—Richard J. Johnson
*Attorney, Agent, or Firm*—John M. Harrison

[57] ABSTRACT

A drag attachment for a disk or cultivating implement which includes a linkage system mounted in cooperation with a fluid cylinder apparatus for raising and lowering the disk transport wheels, which linkage system includes a pair of drive arms connected to the rotatably-mounted wheel shaft carrying the transport wheels, a pair of double pivoted links connecting each drive arm to a separate, adjustable connecting rod, which connecting rod is in turn pivotally attached to a pivot arm rotatably mounted on the frame of the disk. A pair of rearwardly and downwardly extending frame arms mounted on the pivot arm and spaced by an arm brace serve to support a drag pipe, harrow or other cultivating implement in a desired attitude. The drag attachment can be manipulated to raise or lower the drag pipe, harrow or other cultivating implement by operation of the conventional fluid cylinder apparatus provided on the disk.

21 Claims, 9 Drawing Figures

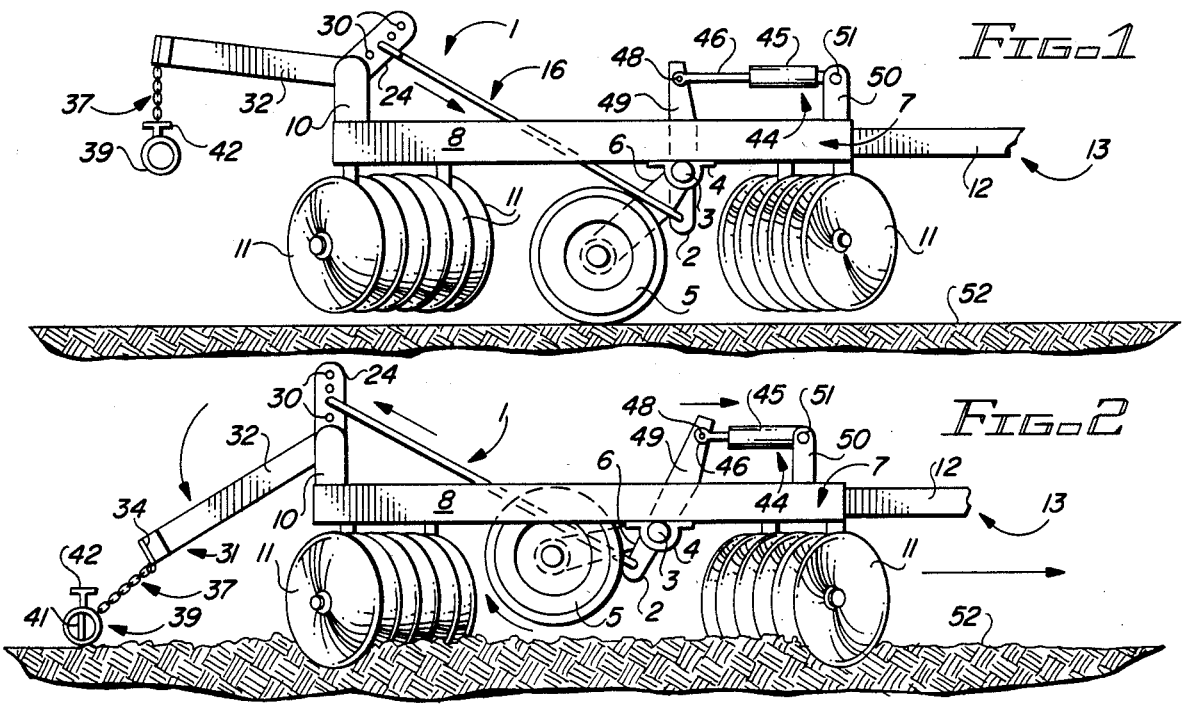
FIG-1
FIG-2
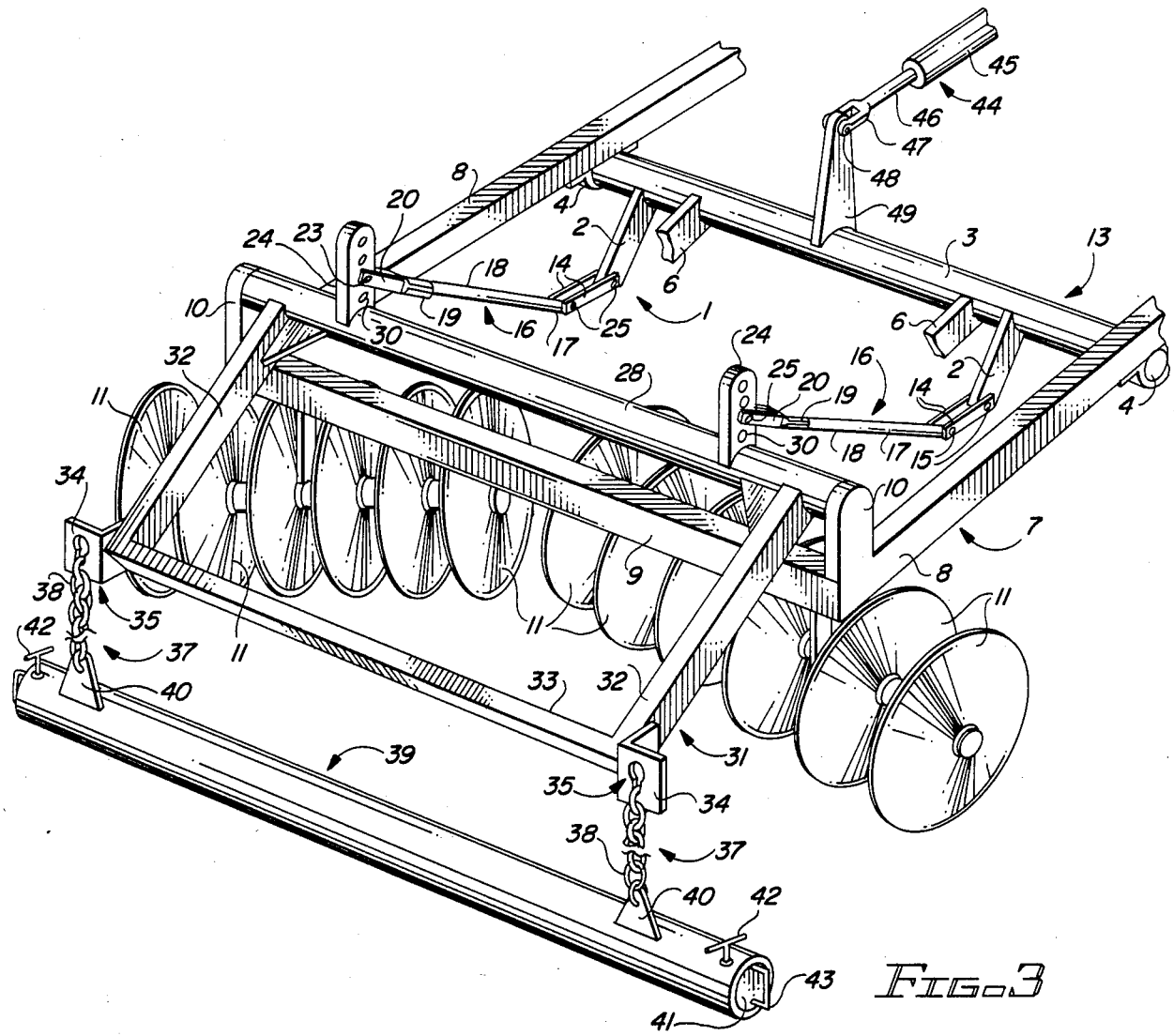
FIG-3

DRAG ATTACHMENT FOR A DISK

BACKGROUND OF THE INVENTION

1. Field of the Invention

This invention relates to agricultural cultivators and more particularly, to a drag attachment and linkage for disks and similar cultivating implements, which drag attachment is adjustably manipulated by operation of one or more conventional fluid cylinders located on the disk to raise and lower a drag pipe, harrow or other ground-engaging agricultural implement connected to the drag attachment.

One of the problems associated with the use of conventional agricultural cultivators such as disks, harrows, chisel plows and like cultivators is the difficulty of operating the cultivators over terrain which is not level. This problem is intensified under circumstances where the farmer is attempting to level the ground and break up the larger clumps of dirt prior to planting. The levelling and seed bed preparation is typically undertaken using two tractors, one of which is used to disk the ground and the other to follow the disk tractor and pull a leveling board or other ground-engaging implement for smoothing the sod turned up by the disk blades. Other problems realized in this procedure are compacting of the ground by the second tractor and increased operating costs resulting from the requirement of using two tractors to achieve the desired goal. Since the preparation of seed beds can cost the farmer from 1% to 5% of the cost of his crop, the economical use of proper agricultural cultivating equipment is important in maximizing profits in the farming operation. Yet another problem arises due to the requirement of periodically raising the ground-engaging implement from contact with the ground for traversing roads and areas of the field which are not to be cultivated. Still another problem encountered in conventional implement raising and lowering equipment found on disks and cultivators is the high frequency of repair which is apparent due to damaging of the equipment by traversal of uneven terrain.

2. Description of the Prior Art

Many agricultural cultivators have been devised in the prior art to smooth the terrain and prepare seed beds for planting crops in farming operations. Cultivator frames which support a variety of ground-engaging implements, including harrow blades, disk blades and chisel plow blades, in non-exclusive particular, have been developed for the purpose of aerating, breaking up and smoothing the ground in order to provide a proper environment for the growth of new plants. Many of these cultivators include transport wheels which are pivotally mounted to the frame members in order to effect a selective lowering of the transport wheels to the ground and raising the cultivator frame and the ground-engaging elements, for transporting the cultivator over highways, roads and areas of the field which are not to be cultivated. Typical of the improvements in leveling mechanisms for cultivators such as disk harrows, is the "Leveling Mechanism for Rigid Frame Disk Harrows", disclosed in U.S. Pat. No. 2,767,538, dated Oct. 23, 1956, to Earl L. Scheidenhelm. This device includes an improved leveling mechanism wherein the tongue of the frame of the device which is attached to the towing vehicle and the supporting wheels of the frame are controlled together, so as to maintain the frame in a level attitude or at a desired angle with respect to the horizontal, together with depth control means operable to limit the lowering of the disks in both the disking and carrying positions. U.S. Pat. No. 4,428,435, dated Jan. 31, 1984, to Kevin L. Hubbard discloses an "Agricultural Implement with Hitch Control", which is designed to enable the implement to follow the ground contour by providing a floating hitch member. The device includes a linkage connected between a hitch member control mechanism and the cranked axle that serves as the wheeled carrying structure for the implement main frame. The linkage is arranged such that when the main frame is in a lowered or operating mode, a stop is spaced from the hitch member control so that the hitch member has a free pivotable movement about a transverse axis. Conversely, when the frame is raised to a transport or raised mode, the stop engages the hitch member control and renders the hitch member rigid with the frame. A "Sectional Implement Having Sequential Lifting and Lowering" is disclosed in U.S. Pat. No. 3,918,529, to Glen E. Frager, et al. The purpose of this implement is to provide a means by which the tool-supporting chassis of the implement may be rocked to the ground in such a manner as to engage one set of tools with the ground prior to engagement of another set of tools. In the case of a disk harrow, for example, it is preferred according to the disclosure, that the rear set of disks be grounded before the front set, thereby avoiding stress problems. The rear of a massive disk harrow is swung toward the ground first until the rear gangs are grounded, whereupon the front of the harrow is then swung downwardly about the fulcrum between the rear gangs and the ground in order to lower the front gangs. The process is reversed when the gangs are raised from the ground with the front of the harrow lifting first, followed by the rear. A special articulated tongue facilitates this rocking action during raising and lowering. U.S. Pat. No. 2,580,100, dated Dec. 25, 1951, to Gordon W. Johansen, et al, discloses an "Implement Raising and Locking Device", which is operative to raise an implement from a lowered working position to a raised inoperative position and in the latter position, to effectively lock the implement and its normally vertically swingable hitch unit against relative buckling in a vertical plane, so that the implement does not teeter when raised for turning in a field or for transportation from place to place. U.S. Pat. No. 3,225,839, dated Dec. 28, 1965, to William H. Petitt, discloses a "Mechanism for Adjusting Tool and Ground Support Relative to Supporting Frame" which is designed as a seed bed preparation device wherein a plurality of ground-engaging implements are pivotally supported on a wheel-transported frame. A plurality of ground-engaging elements such as a spring tube harrow, pulverizer wheels, a pegged tube harrow and a drag board may be pivoted in an agricultural frame by the mechanism disclosed in this patent. A rock shaft is pivoted in the frame and a pair of transport wheels depend from the rock shaft. Link means are provided for interconnecting the rock shaft and one or more of the ground-engaging implements and a hydraulic cylinder is employed to pivot the rock shaft, thus resulting in a longitudinal movement of the link means and simultaneous pivoting of the ground-engaging implements, so that as the transport wheels engage the ground, the ground-engaging elements are withdrawn from the ground and vice versa. U.S. Pat. No. 3,090,447, dated May 21, 1963, to Robert J. Hotchkiss, Jr., discloses a "Combination Disk Harrow and Tooth Drag Attachment". This patent discloses a cultivator attachment in which the draw bars of the attachment are pivotally connected to a wheel-carrying element of the harrow, the pivotal connection permitting both horizontal and vertical movement of the attachment relative to the harrow.

One of the problems associated with cultivators having retractible or pivoting ground-engaging members such as the mechanisms disclosed in U.S. Pat. Nos. 3,225,839 and 3,090,447 described above, is the lack of sufficient range of lifting motion to prevent damage during traversal of uneven terrain. For example, if the ground-engaging implements are not lifted sufficiently high by operation of the lifting mechanism to prevent damage due to contact with stumps, logs or uneven terrain, costly repairs may be necessary. Another problem is lack of a built-in shock absorbing feature to prevent damage to the linkage systems resulting from contact with an unyielding object while the ground-engaging members are in the lowered configuration.

It is an object of this invention to provide a new and improved drag attachment for agricultural cultivators which requires minimum maintenance and is capable of traversing uneven ground without damage to the ground-engaging attachment elements or implements.

Another object of this invention is to provide a drag attachment and linkage for a disk or agricultural cultivator which is simple in design, easy to operate and utilizes the conventional transport wheels and hydraulic cylinder system provided on the disk or cultivator for operation.

Still another object of this invention is to provide a new and improved drag attachment for a disk or agricultural cultivator which incorporates a shock absorbing feature and is characterized by at least one drive arm connected to the conventional wheel shaft used to raise and lower the transport wheels, a pair of connecting links pivotally attached to the drive arm and to one end of a connecting rod, which connecting rod is in turn adjustably pivoted to a pivot arm rigidly carrying a lift frame which supports a drag pipe having pipe extenders telescoped therein.

Yet another object of the invention is to provide an adjustable support or linkage attachment for ground-engaging implements or components in a disk or agricultural cultivator, which attachment serves to strengthen the disk or cultivator frame and cooperates with the transport wheel raising and lowering mechanism to raise the ground-engaging implements when the transfer wheels are lowered or deployed on the ground and vice-versa, in an optimum range of motion.

A still further object of this invention is to provide a new and improved drag attachment or linkage system for a disk or agricultural cultivator, which attachment includes a pair of drive arms fixed to the pivotable conventional wheel shaft of a conventional disk, where the wheel shaft is designed to raise and lower the disk transport wheels, a set of double pivot links connecting each of the drive arms to one end of a pair of connecting rods adjustably attached to a clevis mount fixed to a pivot arm which is also pivoted to the frame of the disk at each end, with a pair of frame arms fixed to the pivot arm and extending downwardly to support a drag pipe, harrow or other leveling device, which leveling device can be quickly raised and lowered by pivoting the wheel shaft while raising and lowering the transport wheels.

SUMMARY OF THE INVENTION

These and other objects of the invention are provided in a new and improved drag attachment for a disk or agricultural cultivator having a conventional pivotable wheel shaft and transport wheels fixed to the wheel shaft and provided with a hydraulic piston in cooperation with the wheel shaft for deploying the transport wheels in functional configuration against the ground or in retracted configuration to permit the ground-engaging implements of the cultivating implement to engage the ground, which drag attachment includes, in a preferred embodiment, a pair of drive arms fixed to the wheel shaft and each connected to one end of a cooperating connecting rod by means of a pair of link members, with the other end of each connecting rod adjustably secured to a pivot arm pivotally mounted in the cultivating implement frame and a pair of frame arms extending at a selected angle downwardly from fixed attachment to the pivot arm and spaced by an arm brace for supporting a drag pipe or other ground-engaging implement, wherein the drag pipe or alternative implement can be raised and lowered by operation of the conventional hydraulic cylinder as the transport wheels are raised and lowered.

BRIEF DESCRIPTION OF THE DRAWINGS

The invention will be better understood by reference to the accompanying drawings wherein:

FIG. 1 is a left side elevation of a conventional disk with the drag attachment of this invention installed thereon and illustrated in raised configuration and the conventional transport wheels engaging the ground;

FIG. 2 is a side elevation of the conventional disk illustrated in FIG. 1 with the drag attachment in lowered, deployed configuration and the transport wheels raised;

FIG. 3 is a perspective view, partially in section, of the drag attachment mounted on a conventional disk with a drag pipe suspended therefrom by means of a chain;

DESCRIPTION OF THE PREFERRED EMBODIMENTS

Figure 4:
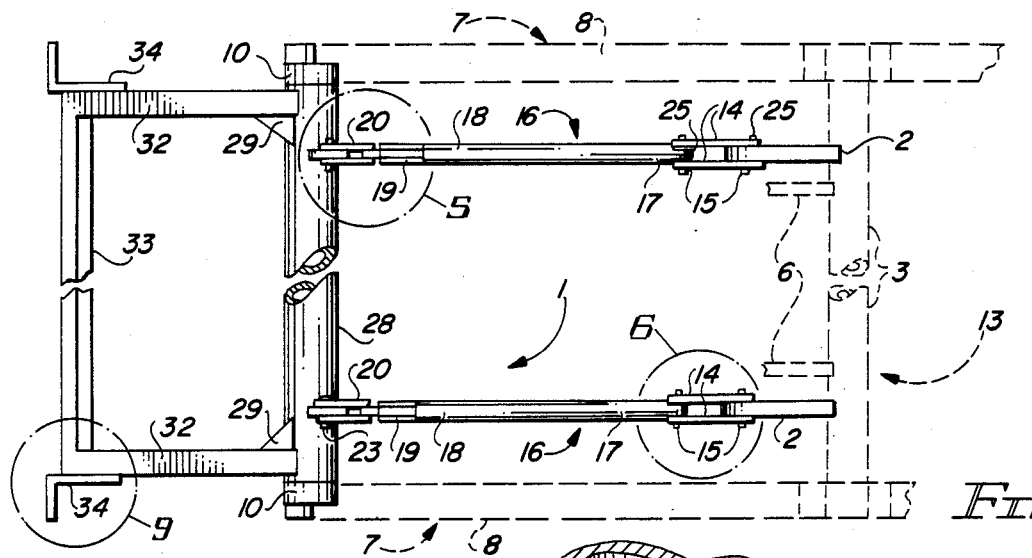
FIG. 4 is a top elevation, partially in section, of the drag attachment of this invention with conventional disk frame elements illustrated in phantom.
Figure 7:
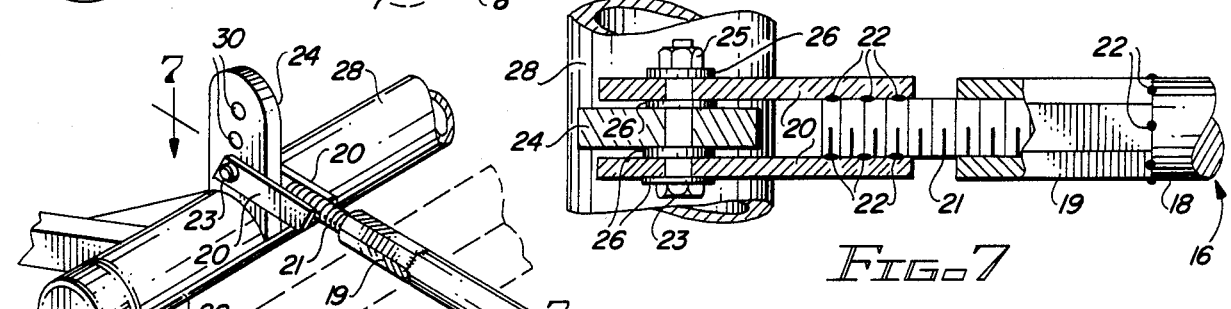
FIG. 7 is a top sectional view, taken along lines 7—7 in FIG. 5, of the preferred adjustable connection between each connecting rod and the pivot arm.

Referring initially to FIGS. 1-4 of the drawings in a preferred embodiment the drag attachment of this invention is generally illustrated by reference numeral 1, and is installed in a disk generally illustrated by reference numeral 13. The disk 13 is fitted with a conventional hydraulic cylinder 44, which includes a cylinder housing 45 and a cylinder piston 46, which is extendable and retractable in the cylinder housing 45, with a piston clevis 47 provided on the extending end of the cylinder piston 46. The cylinder housing 45 is pivoted to a piston bracket 50, secured to a frame member (not illustrated) in the disk frame 7, by means of a bracket pin 51. The piston clevis 47 in the cylinder piston 46 is pivotally attached to a piston arm 49 by means of a clevis pin 48 and the piston arm 49 is in turn secured to a wheel shaft 3, which is pivotally mounted to the side frame members 8 of the disk frame 7, as illustrated in FIG. 3. The side frame members 8 of the disk frame 7 are spaced at the rear ends thereof by a rear frame member 9 and are extended at the front thereof by front frame members 12, which converge to support a trailer hitch (not illustrated) of suitable design. The pivoting action of the wheel shaft 3 is facilitated by mounting the ends of the wheel shaft 3 in a pair of wheel shaft brackets 4, which are each secured to one of the side frame members 8 such that the wheel shaft 3 is permitted to pivot with respect to the wheel shaft brackets 4 and the side frame members 8, responsive to extension and retraction of the cylinder piston 46 in the cylinder housing 45, as hereinafter described. A pair of wheel brackets 6 are fixed to the wheel shaft 3 in generally parallel relationship and each of the wheel brackets 6 carries a transport wheel 5, which is rotatably provided on the extending end of a wheel bracket 6. Accordingly, referring again to FIGS. 1 and 2 of the drawings, when the cylinder piston 46 of the hydraulic cylinder 44 is extended from the cylinder housing 45 as illustrated in FIG. 1, each transport wheel 5 is forced downwardly by the pivoting action of the piston arm 49 and the wheel shaft 3 to engage the ground 52, lift the disk frame 7 and locate the attached disk blades 11 clear of the ground 52. Alternatively, as illustrated in FIG. 2, when the cyinder piston 46 is retracted in the cylinder housing 45 and the piston arm 49 is pivoted toward the hydraulic cylinder 44, each transport wheel 5 is caused to move upwardly, allowing the disk frame 7 to settle and the disk blades 11 to engage and penetrate the ground 52.

As further illustrated in FIGS. 3 and 4 the drag attachment 1 of this invention includes a pair of drive arms 2, spaced from each other and fixed to the wheel shaft 3 and extending substantially parallel to and outside of the wheel brackets 6, as illustrated in FIG. 3 of the drawings. A pair of drive arm links 14 are pivotally attached to the extending ends of each of the drive arms 2 in substantially parallel relationship by means of link shoulder bolts 15, secured by nuts 25. The opposite ends of the drive arm links 14 receive the link ends 17 of a pair of connecting rods 16, by means of additional link shoulder bolts 15 and cooperating nuts 25, as illustrated. The connecting rods 16 extend from the corresponding set of drive arm links 14 upwardly and the opposite adjusting end 18 of each connecting rod 16 is connected by means of a clevis 20 and a hex fitting 19, to a clevis mount 24, by means of a clevis shoulder bolt 23 and a cooperating nut 25. The clevis mount 24 is in turn fixed to a pivot arm 28, which is pivotally carried by a pair of arm supports 10, secured to each of the side frame members 8. A pair of frame arms 32 extend downwardly from fixed attachment to the pivot arm 28 and are spaced at the extending ends thereof by an arm brace 33, to define a drag support frame 31. A pair of chain brackets 34 are welded or otherwise attached to the extending ends of the frame arms 32 at the point where the arm brace 33 joins the frame arms 32, as illustrated. A primary drag pipe 39 is secured to one end of a pair of chains 37 by means of spaced chain mounts 40 and the opposite ends of the chains 37 are removably secured in the key hole slots 36 of the key holes 35, respectively, provided in each chain bracket 34, as illustrated in FIG. 3.

Referring now to FIGS. 1–4, 6 and 8 of the drawings in a most preferred embodiment of the invention each of the drive arms 2 is secured to the link end 17 of a connecting rod 16 by means of a pair of spaced, generally parallel drive arm links 14, which overlap the drive arms 2 at one end and a neck 27, provided in the link ends 17 of each of the connecting rods 16, at the opposite end. One end of each pair of the drive arm links 14 is pivotally secured to a corresponding drive arm 2 by means of a link shoulder bolt 15, secured by a nut 25, as heretofore described. The opposite end of each pair of the drive arm links 14 is secured to the neck 27 of a corresponding connecting rod 16 by means of a second link shoulder bolt 15, which is in turn secured in position by another nut 25. It will be therefore be appreciated by those skilled in the art that the drive arm links 14 serve to provide a double-pivot function between the drive arms 2 and the connecting rods 16, for shock absorbing and other purposes which will be hereinafter further described.

Figure 5:
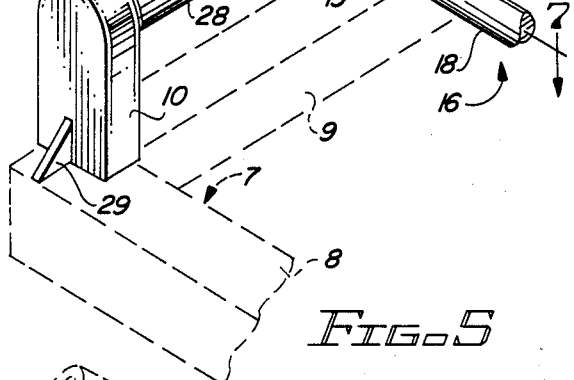
FIG. 5 is a perspective view, partially in section, of a preferred pivot arm and connecting rod attachment in the drag attachment of this invention.

Referring now to FIGS. 1–4, 5 and 7 of the drawings in another most preferred embodiment of the invention the adjusting ends 18 of each of the connecting rods 16 are provided with a hex fitting 19, which is internally threaded and receives one end of a threaded rod 21, the other end of which threaded rod 21 is attached to the clevis 20 by means of welds 22. The clevis 20 is further pivotally secured to the clevis mount 24 by means of a clevis shoulder bolt 23, a cooperating nut 25 and washers 26, as illustrated. Accordingly, it will be appreciated that the distance between the adjusting end 18 of the connecting rod 16 and the clevis 20 and the length of each connecting rod 16 can be altered by internally threading the threaded rod 21 into and out of the hex fitting 19, respectively, for purposes which will be hereinafter further described. In an alternative embodiment provided as illustrated in FIG. 5, adjusting apertures 30 are provided in the clevis mount 24, in order to provide alternative positions for the clevis 20 to adjust the relative movement of the drag support frame 31. A gusset 29 is also welded to each of the arm supports 10 and the corresponding side frame members 8, to further stabilize the arm supports 10 in position on the disk frame 7.

Referring now to FIGS. 1–4 and 9 of the drawings, in yet another most preferred embodiment of the invention each chain bracket 34 is provided with a keyhole 35 which is fitted with a keyhole slot 36 at the bottom thereof and is designed to selectively receive the chain links 38 of the chains 37 in adjustable fashion. For example, referring again to FIG. 3 of the drawing, the distance between the chain brackets 34 and the primary drag pipe 39 can be easily adjusted by lowering the drag support frame 31 into the position illustrated in FIG. 2 according to a procedure hereinafter described to provide slack in the chain 37, removing engaged chain links 38 in the chains 37 from each of the keyhole slots 36 in the chain bracket 34 and reinserting other chain links 38 in the keyhole slots 36, to lengthen that portion of the chains 37 which extend between the chain bracket 34 and primary drag pipe 39. The length of the chains 37 is important in operation of the drag attachment 1 in the disk 13, as hereinafter described.

Referring again to FIGS. 1-3 of the drawings in another most preferred embodiment of the invention the primary drag pipe 39 is provided with a pair of secondary drag pipes 41, which are each characterized by a smaller outside diameter than the inside diameter of the primary drag pipe 39, one of which secondary drag pipes 41 is illustrated telescoped inside the primary drag pipe 39. A T-pin 42 extends through registering apertures (not illustrated) in the primary drag pipe 39 and the secondary drag pipes 41, in order to secure each of the secondary drag pipes 41 inside the primary drag pipe 39 in telescoped configuration. A drag pipe handle 43 is also provided on the ends of each of the secondary drag pipes 41 to facilitate extension of the drag pipes 41 from the primary drag pipe 39 when the T-pins 42 are removed, in order to provide an extended dragging surface for treatment of a larger area as the disk 13 is pulled behind a tractor.

In operation, and referring again to FIGS. 1-4 of the drawings, the disk 13 is initially coupled to a towing vehicle such as a tractor and the hydraulic cylinder 44 activated to retract the cylinder piston 46 into the cylinder housing 45, as illustated in FIG. 2. This action pivots the piston arm 49 toward the piston bracket 50 and rotates the wheel shaft 3 in the clockwise direction, when the disk 13 is viewed as illustrated in FIG. 2. Rotation of the wheel shaft 3 thusly raises the wheel brackets 6 and the transport wheels 5 and also raises the drive arms 2 and the two sets of drive arm links 14. The two connecting rods 16 therefore move rearwardly in the direction of the arrow responsive to operation of the cylinder piston 46 and the action of gravity, as illustrated in FIG. 2. This linear movement of the connecting rods is simultaneous with rotation of the pivot arm 28 and the clevis mount 24 pivots rearwardly, to lower the frame arms 32 and the arm brace 33, which define the drag support frame 31.

Figure 9:
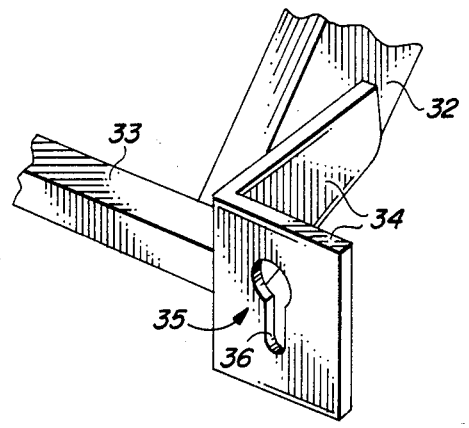
FIG. 9 is a perspective view, partially in section, of a preferred chain bracket carried by the extending frame arms and arm brace for supporting a chain and a drag pipe, according to a preferred aspect of the invention.
Figure 6:
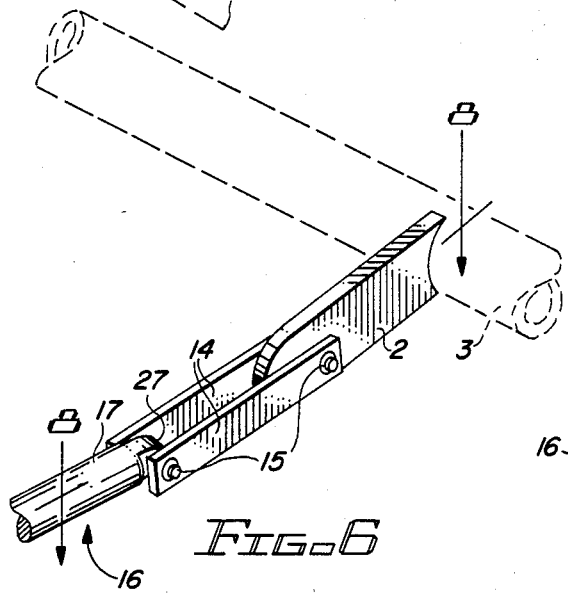
FIG. 6 is a perspective view, partially in section, of a preferred linking mechanism for joining the connecting rods to the drive arms in the drag attachment.
Figure 8:
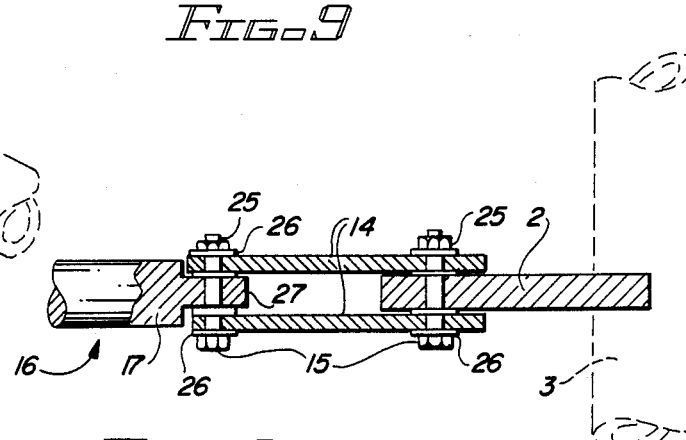
FIG. 8 is a sectional view, taken along lines 8—8 in FIG. 6, of the preferred linking mechanism illustrated in FIG. 6.

Referring now to FIGS. 3 and 9, the ends of a pair of chains 37 are attached to the chain mount 40 of the primary drag pipe 39 and the chains 37 are then each attached to a separate chain bracket 34 in the drag support frame 31, by extending the opposite ends of the chains 37 through the respective keyholes 35 in the chain brackets 34 and inserting a selected chain link 38 in each keyhole slot 36, to removably secure the primary drag pipe 39 to the drag support frame 31. The primary drag pipe 39 can then be pulled over the terrain to seal moisture into the soil and break up clumps of earth in the course of preparing a seed bed for planting. Under circumstances where it is desired to prepare larger areas with a single pass of the disk 13, the T-pins 42, illustrated in FIG. 3, can be removed from engagement with the primary drag pipe 39 and the two secondary drag pipes 41 which are telescoped inside the primary drag pipe 39. The secondary drag pipes 41 can then be extended to the desired extent from the primary drag pipe 39, the T-pins 42 reinserted in aligned apertures in the primary drag pipe 39, and the primary drag pipe 39 and secondary drag pipes 41 used in combination to prepare a larger area of seed bed for each pass of the disk 13. If additional weight is needed to break up hard clods of dirt or level uneven terrain, the secondary drag pipes 41 can be filled with water, as deemed necessary, since in a preferred embodiment of the invention, the ends of each of the secondary drag pipes 41 are sealed.

Referring again to FIGS. 1-4 of the drawings, when it is desired to raise the primary drag pipe 39 from the ground as illustrated in FIG. 1, the chains 37 are first shortened to a desired extent by inserting selected chain links 38 in the keyhole slots 36, respectively, and the hydraulic cylinder 44 is activated to extend the cylinder piston 46 from the cylinder housing 45. This action lowers the transport wheels 5, raises the disk frame 7 and locates the disk blades 11 above the ground 52. Extension of the cylinder piston 46 also lowers the drive arms 2, pulls the connecting rods 16 forwardly in the direction of the arrow and rotates the clevis mount 24 forwardly, to exert a forward torque on the pivot arm 28. Rotation of the pivot arm 28 in the clockwise direction when the disk 13 is viewed as illustrated in FIG. 1 raises the drag support frame 31 and the primary drag pipe 39 to the position illustrated in FIG. 1. This orientation of the primary drag pipe 39 is useful not only for purposes of transporting the disk 13 to and from a field without fear of accidentally engaging an obstacle and damaging the disk 13, but also for disking operations where additional weight is needed on the disk 13 to cause the disk blades 11 to cut more deeply into the soil. For example, when the disk 13 is in the functional configuration illustrated in FIG. 2 and referring again to FIGS. 3 and 5, the clevis 20 can be repositioned in an adjusting aperture 30 which is closer to the top of the clevis mount 24, which results in a greater movement of the drag support frame 31 for a corresponding movement of the drive arms 2, responsive to operation of the hydraulic cylinder 44. This motion can be accentuated by threadibly lengthening each connecting rod 16 by unthreading the hex fittings 19 from the respective threaded rods 21 to a desired extent. Accordingly, when each of the chains 37 are shortened to a desired extent as heretofore described, the clevis 20 is so repositioned and the length of each connecting rod 16 is properly adjusted, the primary drag pipe 39 can be suspended from the ground 52 to enable greater penetration of the disk blades 11 into the ground, by carefully operating the hydraulic cylinder 44 and raising the transport wheels 5.

Referring again to FIGS. 2 and 3, it will be appreciated by those skilled in the art that the two sets of drive arm links 14 act as shock absorbers when the primary drag pipe 39 contacts an obstacle, or traverses uneven terrain. This safety feature serves to prevent damage to the drag attachment 1 and the disk 13 by allowing the drag support frame to move up and down with a degree of freedom, as the primary drag pipe 39 or other selected ground-engaging implement traverses the ground. This slack or degree of freedom provided in the drag support frame 31 is facilitated by articulation in the drive arm links 14, which articulation is caused by the relative freedom in the pinned ends of the drive arm links 14. Accordingly, if the primary drag pipe 31 should strike a stump and impart a sudden jolt to the drag suport frame 31, the drive arm links 14 serve to allow the drag support frame 31 to move upwardly or downwardly and bounce over the stump without damaging either the drag attachment 1 or the disk 13.

It will be further appreciated by those skilled in the art that the drag attachment of this invention is characterized by convenience and flexibility in a relatively simple, yet efficient implement raising and lowering mechanism which operates in cooperation with existing disk transport wheel components. When a primary drag pipe 39 is deployed in functional configuration as illustrated in FIG. 2 of the drawings, the length of the chains 37 can be quickly and easily adjusted by inserting selected chain links 38 in the keyhole slots 36, respectively, of the chain brackets 34 as heretofore described, to "float" the primary drag pipe 39 behind the disk 13 and over the contour of the ground 52 in an optimum manner. The optimum length of the chains 37 will be determined by such factors as the smoothness of the terrain, depth of the penetration of the disk blades 11 and the characteristics of the soil, in non-exclusive particular. Furthermore, the pressure of the primary drag pipe 39, or other selected ground-engaging implement attached to the drag support frame 31 against the ground 52 can be varied by adjusting the length of the chains 37 and raising and lowering the drag support frame 31 by operation of the hydraulic cylinder 44. These adjustments work together to apply a selected force vector of the weight of the primary drag pipe 39 against the soil, wherein the directed force is greatest when the length of the chains 37 is relatively great and the drag support frame 31 is adjusted to a relatively low position. Such adjustments can be quickly made during the disking operation to efficiently adjust the vector of force exerted by a primary drag pipe 39 or other ground-engaging implement against the ground 52. Furthermore, depending upon the position of the clevis 20 with respect to a particular adjusting aperture 30 in the clevis mount 24 and the length of the connecting rods 16, movement of the drag support frame 31 can be relatively slow or fast responsive to movement of the drive arms 2. The drag support frame 31 response time is fastest under circumstances where the clevis 20 is coupled to the clevis mount 24 at a point closet to the pivot arm 28, as illustrated in FIG. 5, while a slower arc of movement in the drag support frame 31 is apparent when the clevis 20 is on the opposite position, located near the end of the clevis mount 24.

The drag attachment of this invention is rugged in design and is capable of operating with minimum maintenance over a long period of time. Furthermore, as heretofore indicated, a variety of ground-engaging implements, including drag pipes, drag boards, harrows and the like, in non-exclusive particular, can be attached to the drag support frame 31, either by means of the chains 37 or otherwise, to perform the desired cultivating functions. It is also understood that while a single drive arm 2 and connecting rod 16 can be used on smaller versions of the disk 13, two or more drive arms 2 and connecting rods 16 can be used on larger disks, in the manner described above. In the case of still larger disk, it may be necessary to install two sets of the drag attachment 1 and a second or third hydraulic cylinder 44 may be necessary to aid the original equipment hydraulic cylinder in raising and lowering the transport wheels 5 and the dual drag support frames 31. The drag attachment 1 of this invention can be adapted to substantially any existing disk or cultivating implement which uses a fluid cylinder to raise and lower transport wheels, including disks and chisel plows, in non-exclusive particular.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. In a cultivating device having a frame, a shaft pivotally mounted in the frame, transport wheels carried by the shaft and a fluid-operated cylinder in cooperation with the shaft for raising and lowering the transport wheels, the improvement in combination therewith comprising:
   (a) at least one drive arm extending from the shaft in fixed relationship;
   (b) a pivot arm rotatably cooperating with the cultivating device in spaced, substantially parallel relationship with respect to the shaft;
   (c) at least one connecting rod having one end pivotally carried by said pivot arm, said connecting rod extending toward said drive arm and the opposite end of said connecting rod in close proximity to said drive arm;
   (d) linking means joining said drive arm to said opposite end of said connecting rod; and
   (e) support means fixedly carried by said pivot arm, whereby operation of the fluid-operated cylinder in a first selected mode raises the transport wheels and lowers said support means and operation of the fluid-operated cylinder in a second selected mode lowers the transport wheels and raises said support means; and
   (f) a drag pipe carried by said support means and a pair of auxiliary drag pipes provided in each end of said drag pipe in telescoping relationship, respectively.

2. The improvement according to claim 1 further comprising at least one clevis mount fixedly attached to said pivot arm and wherein said one end of said connecting rod is pivotally attached to said clevis mount.

3. The improvement according to claim 1 further comprising adjusting means in said connecting rod for adjusting the length of said connecting rod.

4. The improvement according to claim 1 further comprising:
   (a) a ground-engaging implement removably carried by said support means for engaging the ground when said support means is lowered by the fluid-operated cylinder;
   (b) at least one clevis mount fixedly attached to said pivot arm and wherein said one end of said connecting rod is pivotally attached to said clevis mount; and
   (c) adjusting means in said connecting rod for adjusting the length of said connecting rod.

5. The improvement according to claim 1 wherein said linking means is a pair of elongated bars disposed in spaced, generally parallel relationship, with one end of said bars pivotally attached to said opposite end of said connecting rod and the other end of said bars pivotally connected to said drive arm.

6. The improvement according to claim 1 further comprising a pair of chain brackets attached to said support means in spaced relationship and a keyhole slot provided in each of said chain brackets.

7. The improvement according to claim 6 further comprising a pair of chains having selected links engaging said keyhole slot, respectively, and wherein said drag pipe is attached to said chains, whereby said drag pipe can be dragged across the ground at a selected distance from said support means when said support means is lowered by the fluid-operated cylinder.

8. The improvement according to claim 7 wherein said linking means is a pair of elongated bars disposed in spaced, generally parallel relationship, with one end of said bars pivotally attached to said opposite end of said connecting rod and the other end of said bars pivotally connected to said drive arm and further comprising:
- (a) at least one clevis mount fixedly attached to said pivot arm and wherein said one end of said connecting rod is pivotally attached to said clevis mount; and
- (b) adjusting means in said opposite end of said connecting rod for adjusting the length of said connecting rod.

9. The improvement according to claim 6 wherein said support means is a pair of frame arms extending in fixed and substantially parallel relationship from said pivot arm and brace means spacing said frame arms at the extending ends of said frame arms and further comprising a pair of chains having selected links engaging said keyhole slot, respectively, and a drag pipe attached to said chains, whereby said drag pipe can be dragged across the ground at a selected distance from said brace means when said support means is lowered by the fluidoperated cylinder.

10. The improvement according to claim 9 wherein said linking means is a pair of elongated bars disposed in spaced, generally parallel relationship, with one end of said bars pivotally attached to said opposite end of said connecting rod and the other end of said bars pivotally connected to said drive arm and further comprising:
- (a) at least one clevis mount fixedly attached to said pivot arm, said clevis mount carrying said one end of said connecting rod; and
- (b) adjusting means in said opposite end of said connecting rod for adjusting the length of said connecting rod.

11. The improvement according to claim 1 wherein said support means is a pair of frame arms extending in fixed and substantially parallel relationship from said pivot arm and brace means spacing said frame arms at the extending ends of said frame arms.

12. In a cultivating device having a frame, a shaft pivotally mounted in the frame, transport wheels carried by the shaft and a fluid-operated cylinder in cooperation with the shaft for raising and lowering the transport wheels, the improvement in combination therewith comprising:
- (a) a pair of drive arms fixedly attached to the shaft and extending from the shaft in substantially perpendicular relationship;
- (b) a pivot arm journaled for rotation in the frame and situated in spaced, substantially parallel relationshp with respect to the shaft;
- (c) a pair of connecting rods pivotally attached in spaced, offset relationship to said pivot arm and extending toward said drive arms and adjusting means provided in said connecting rods;
- (d) linking means pivotally joining said connecting rods to said drive arms, respectively, in dual pivoting relationship;
- (e) support means fixedly carried by said pivot arm, whereby operation of the fluid-operated cylinder in a first selected mode raises the transport wheels and lowers said support means and operation of the fluid-operated cylinder in a second selected mode lowers the transport wheels and raises said support means and
- (f) a pair of chains removably carried by said support means in spaced relationship, a primary drag pipe attached to said chains and a pair of auxiliary drag pipes mounted in telescoping relationship in said primary drag pipe, whereby said drag pipe and said auxiliary drag pipes can be dragged across the ground at a selected distance from said support means when said support means is lowered by the fluid-operated cylinder.

13. The improvement according to claim 12 further comprising a pair of chains removably carried by said support means and drag pipe means attached to one end of said chains, whereby said drag pipe means can be dragged across the ground at a selected distance from said support means when said support means is lowered by the fluid-operated cylinder.

14. The improvement according to claim 12 wherein said linking means is two sets of elongated bars, with each of said sets disposed in spaced, generally parallel relationship and with one end of said sets pivotally attached to the extending ends of said connecting rods, respectively, and the other ends of said sets of said bars pivotally connected to said drive arms, respectively.

15. The improvement according to claim 14 further comprising a pair of chain brackets attached to said support means in spaced relationship and a keyhole slot provided in each of said chain brackets and wherein selected links of said chains are positioned in engagement with said keyhole slot, respectively.

16. The improvement according to claim 15 further comprising a pair of clevis mounts fixedly secured to said pivot arm, said clevis mounts receiving said connecting rods in pivoting relationship.

17. In a cultivating device having a frame, a shaft pivotally mounted in the frame, transport wheels carried by the shaft and a fluid-operated cylinder in cooperation with the shaft for raising and lowering the transport wheels, the improvement in combination therewith comprising:
- (a) a first drive arm fixedly attached to the shaft and a second drive arm fixedly attached to the shaft and spaced from said first drive arm, said first drive arm and said second drive arm extending from the shaft in substantially perpendicular relationship;
- (b) a pivot arm pivotally mounted in the frame and situated in spaced, substantially parallel relationship with respect to the shaft;
- (c) a first clevis mount fixedly attached to said pivot arm and a first connecting rod pivotally attached to said first clevis mount with an extending end of said first connecting rod situated in close proximity to said first drive arm;
- (d) a second clevis mount fixedly attached to said pivot arm in spaced relationship with respect to said first clevis mount and a second connecting rod pivotally attached to said second clevis mount with an extending end of said second connecting rod situated in close proximity to said second drive arm;
- (e) a first set of elongated bars disposed between said extending end of said first connecting rod and said first drive arm, with one end of said first set of elongated bars pivotally attached to said extending end of said first connecting rod and the other end of said first set of elongated bars pivotally connected to said first drive arm;
- (f) a second set of elongated bars disposed between said extending end of said second connecting rod and said second drive arm with one end of said second set of elongated bars pivotally attached to said extending end of said second connecting rod and the other end of said second set of elongated bars pivotally connected to said second drive arm; and (g) a pair of frame arms extending in fixed and substantially parallel relationship from said pivot arm and a brace spacing said frame arms at the extending ends of said frame arms.

18. The improvement according to claim 17 further comprising a pair of chain brackets attached to said brace in spaced relationship and a keyhole provided in each of said chain brackets, with a keyhole slot provided in said keyhole.

19. The improvement according to claim 18 further comprising adjusting means in said first and second connecting rod for adjusting the length of said first and second connecting rod.

20. The improvement according to claim 19 further comprising a pair of chains having chain links engaging said keyhole slot in said chain brackets, respectively, and a ground-engaging implement attached to said chains for traversing the ground behind the cultivating device.

21. The improvement according to claim 20 wherein said implement is a drag pipe provided with a pair of auxiliary drag pipes disposed in said drag pipe in telescoping configuration.

* * * * *